United States Patent
Lee

(10) Patent No.: US 9,132,745 B1
(45) Date of Patent: Sep. 15, 2015

(54) FREQUENCY BASED BATTERY MODEL PARAMETER ESTIMATION

(71) Applicant: FORD GLOBAL TECHNOLOGIES, LLC, Dearborn, MI (US)

(72) Inventor: Tae-Kyung Lee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 52 days.

(21) Appl. No.: 14/215,308

(22) Filed: Mar. 17, 2014

(51) Int. Cl.
*B60L 11/18* (2006.01)
*B60W 20/00* (2006.01)

(52) U.S. Cl.
CPC ......... *B60L 11/1861* (2013.01); *B60L 11/1864* (2013.01); *B60W 20/00* (2013.01); *B60W 2400/00* (2013.01); *B60W 2510/242* (2013.01); *B60W 2710/244* (2013.01); *Y10S 903/903* (2013.01)

(58) Field of Classification Search
CPC ........... B60L 11/1861; B60L 11/1864; B60W 20/00; B60W 2710/244; B60W 2510/242; B60W 2400/00; Y10S 903/903; G01R 31/3606
See application file for complete search history.

(56) References Cited

U.S. PATENT DOCUMENTS

| | | | |
|---|---|---|---|
| 5,945,808 A * | 8/1999 | Kikuchi et al. | 320/132 |
| 6,160,382 A | 12/2000 | Yoon et al. | |
| 6,167,349 A | 12/2000 | Alvarez | |
| 6,208,147 B1 | 3/2001 | Yoon et al. | |
| 7,518,339 B2 | 4/2009 | Schoch | |
| 7,764,049 B2 | 7/2010 | Iwane et al. | |
| 7,847,557 B2 | 12/2010 | Yun et al. | |
| 8,332,342 B1 * | 12/2012 | Saha et al. | 706/45 |
| 2007/0090843 A1 * | 4/2007 | De Doncker et al. | 324/426 |
| 2011/0060565 A1 * | 3/2011 | Sciarretta et al. | 703/2 |
| 2011/0309838 A1 * | 12/2011 | Lin et al. | 324/427 |
| 2012/0101674 A1 | 4/2012 | Wang et al. | |
| 2012/0306504 A1 * | 12/2012 | van Lammeren | 324/430 |
| 2014/0333317 A1 * | 11/2014 | Frost et al. | 324/430 |

OTHER PUBLICATIONS

Schweiger et al.; Comparison of Several Methods for Determining the Internal Resistance of Lithium Ion Cells; www.mdpi.com/journal/sensors; Jun. 3, 2010.*
Coleman et al.; State-of-Charge Determination from EMF Voltage Estimation: Using Impedence, Terminal Voltage, and Current for Lead-Acid and Lithium-Ion Batteries; Industrial Electronics, IEEE; vol. 54, No. 5; pp. 2550-2557; Oct. 2007.*
Liu et al.; State-of-Charge Estimation for Power Li-ion Battery Pack Using Vmin-EKF; 2nd Intl. Conf. on Software Engineering and Data Mining (SEDA), 2010; p. 27-31; Jun. 23-25, 2010.*

(Continued)

*Primary Examiner* — Michael J Zanelli
(74) *Attorney, Agent, or Firm* — David B. Kelley; Brooks Kushman P.C.

(57) ABSTRACT

A hybrid powertrain system includes a battery and at least one controller. The at least one controller is configured to determine instantaneous battery power limits during operation of the system using filtered battery voltage signals and current input signals. The at least one controller is further configured to separate medium-to-high frequency dynamics of the measured battery voltage. The filtering process, in certain examples, is realized using a low pass filter or a high pass filter. The at least one controller is further configured to correlate the medium-to-high frequency loads to estimate battery parameters and determine battery dynamics using, in one example, an Extended Kalman Filter.

19 Claims, 5 Drawing Sheets

(56) References Cited

OTHER PUBLICATIONS

Yan et al.; A Novel On-Line Self-Learning State-of-Charge Estimation of Battery Management System for Hybrid Electric Vehicle; Intelligent Vehicles Symposium, 2009 IEEE; pp. 1161-1166; Jun. 3-5, 2009.*

Plett; Extended Kalman filtering for battery management systems of LiPB-based HEV battery packs, Part 1. Background; Journal of Power Sources 134 (2004); p. 252-261; Jun. 9, 2004.*

Blanke et al.; Impedance measurements on lead-acid batteries for state-of-charge, state-of-health and cranking capability prognosis in electric and hybrid vehicles; Journal of Power Sources 144 (2005); p. 418-425; Dec. 30, 2004.*

* cited by examiner

FREQUENCY BASED BATTERY MODEL PARAMETER ESTIMATION

TECHNICAL FIELD

The present disclosure relates to battery management techniques capable of estimating parameters of elements forming a battery model for providing control of an associated battery.

BACKGROUND

Hybrid electric vehicles (HEV) utilize a combination of an internal combustion engine with an electric motor to provide motive power. This arrangement provides improved fuel economy over a vehicle that has only an internal combustion engine. One method of improving the fuel economy in an HEV is to shutdown the engine during times that the engine operates inefficiently, and is not otherwise needed to propel the vehicle. In these situations, the electric motor is used to provide all of the power needed to propel the vehicle. When the driver power demand increases such that the electric motor can no longer provide enough power to meet the demand, or in other cases such as when the battery state of charge (SOC) drops below a certain level, the engine should be started.

SUMMARY

A vehicle includes a battery pack and at least one controller programmed to operate the battery pack in response to parameter values that are based on the terminal voltage of the battery pack. The terminal voltage of the battery pack has frequency content greater than or less than a threshold value. The parameter values are indicative of (i) an internal resistance of the battery pack based on the terminal voltage having frequency content less than the threshold value and (ii) an internal impedance of the battery pack based on the terminal voltage having frequency content greater than the threshold value.

A battery management method is presented for controlling a battery pack based on the battery's terminal voltage data. The method may control operation of the battery pack in response to parameter values indicative of an internal resistance of the battery pack that are based on terminal voltage data having frequency content less than a threshold frequency. The method may control operation of the battery pack in response to parameter values indicative of an internal impedance of the battery pack that are based on the terminal voltage data having frequency content greater than the threshold frequency.

A hybrid powertrain system includes a battery and at least one controller that implements a model of the battery pack. The at least one control filters terminal voltage data of the battery pack into high-frequency content having frequencies greater than a threshold and low-frequency content having frequencies less than threshold. The at least one controller controls operation of the battery pack in response to predicted battery available power derived from parameter values indicative of an internal resistance of the battery pack that are based on the low-frequency content and parameter values indicative of an internal impedance of the battery pack that are based on the high-frequency content.

DETAILED DESCRIPTION

Figure 1:
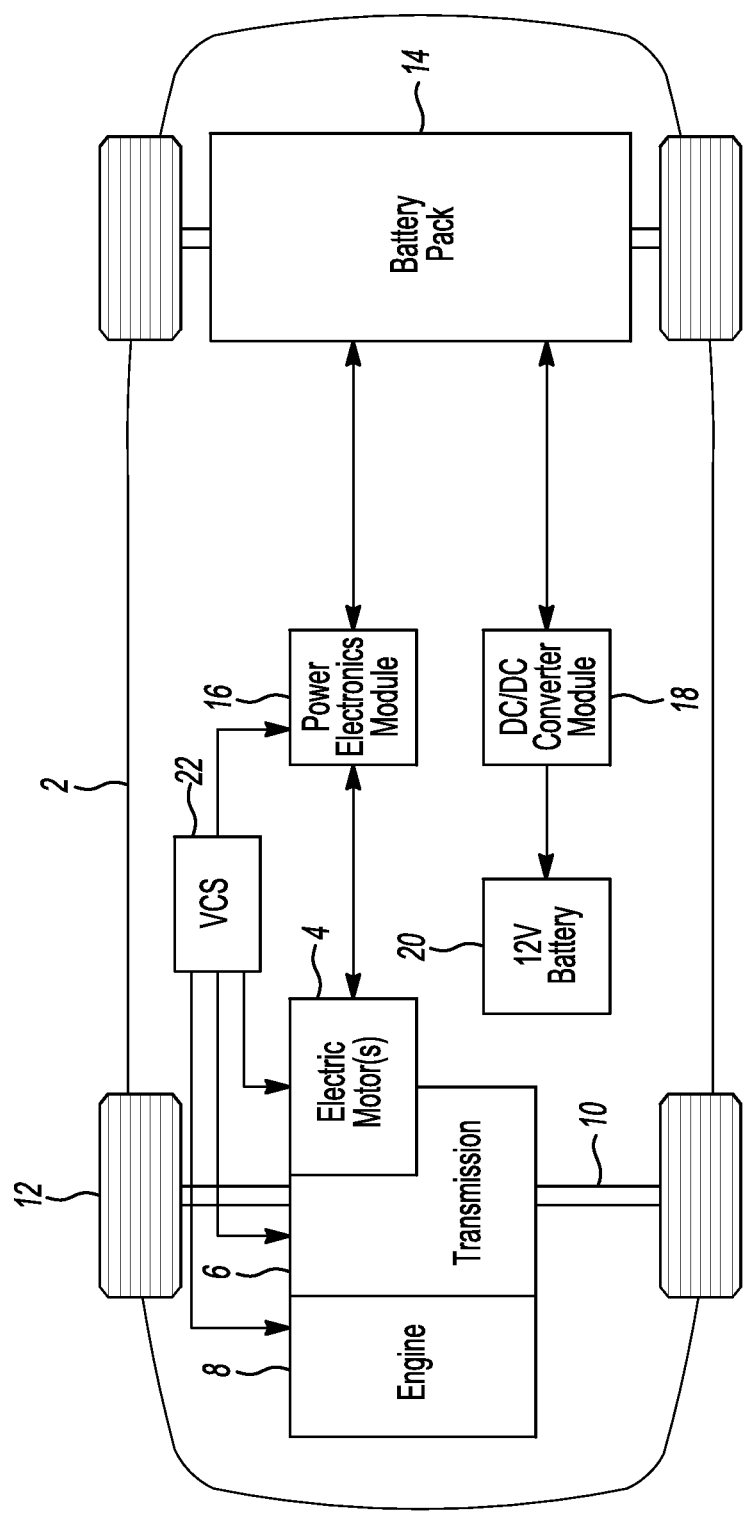
FIG. 1 is a schematic diagram of a hybrid-electric vehicle illustrating typical drivetrain and energy storage components.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

An HEV battery system may implement a battery management strategy that estimates values descriptive of the present operating condition of the battery and/or one or more battery cells. The battery pack and/or one or more cells operating conditions include battery state of charge, power fade, capacity fade, and instantaneous available power. The battery management strategy may be capable of estimating values as cells age over the lifetime of the pack. The precise estimation of some parameters may improve performance and robustness, and may ultimately lengthen the useful lifetime of the battery pack. For the battery system described herein, estimation of some battery pack and/or cell parameters can be realized as discussed below.

FIG. 1 depicts a typical hybrid-electric vehicle. A typical hybrid-electric vehicle 2 may comprise one or more electric motors 4 mechanically connected to a hybrid transmission 6. In addition, the hybrid transmission 6 is mechanically connected to an engine 8. The hybrid transmission 6 is also mechanically connected to a drive shaft 10 that is mechanically connected to the wheels 12. In another embodiment not depicted in the illustration, the hybrid transmission may be a non-selectable gear transmission that may include at least one electric machine. The electric motors 4 can provide propulsion and deceleration capability when the engine 8 is turned on or off. The electric motors 4 also act as generators and can provide fuel economy benefits by recovering energy that would normally be lost as heat in the friction braking system. The electric motors 4 may also provide reduced pollutant emissions since the hybrid electric vehicle 2 may be operated in electric mode under certain conditions.

A battery pack 14 may include, but is not limited to, a traction battery having one or more battery cells that store energy which can be used by the electric motors 4. The vehicle battery pack 14 typically provides a high voltage DC output and is electrically connected to a power electronics module 16. The power electronics module 16 may communicate with one or more control modules that make up a vehicle computing system 22. The vehicle computing system 22 may control several vehicle features, systems, and/or subsystems. The one or more modules may include, but are not limited to, a battery management system. The power electronics module 16 is also electrically connected to the electric motors 4 and provides the ability to bi-directionally transfer energy between the battery pack 14 and the electric motors 4. For example, a typical battery pack 14 may provide a DC voltage while the electric motors 4 may require three-phase AC current to function. The power electronics module 16 may convert the DC voltage to a three-phase AC current as required by the electric motors 4. In a regenerative mode, the power electronics module 16 will convert the three-phase AC current from the electric motors 4 acting as generators to the DC voltage required by the battery pack 14.

In addition to providing energy for propulsion, the battery pack 14 may provide energy for other vehicle electrical systems. A typical system may include a DC/DC converter module 18 that converts the high voltage DC output of the battery pack 14 to a low voltage DC supply that is compatible with other vehicle loads. Other high voltage loads may be connected directly without the use of a DC/DC converter module 18. In a typical vehicle, the low voltage systems are electrically connected to a 12V battery 20.

The battery pack 14 may be controlled by the power electronics module 16 which may receive commands from a vehicle computing system 22 having one or more control modules. The one or more control modules may include, but are not limited to, a battery control module. The one or more control modules may be calibrated to control the battery pack 14 using a battery model parameter estimation method which estimates an average sense of effective battery internal resistance during operation to determine battery power capability. The power capability prediction enables the battery pack 14 to prevent over-charging and over-discharging which could lead to reducing the life of the battery, performance issues with the vehicle powertrain, etc.

The battery parameter prediction method and/or strategy may assist in determining battery current limits and power capability in real-time (i.e., during operation). Many battery parameter estimation processes are affected by the fidelity of battery models and unpredicted environmental conditions or unexpected noises during battery operations. The vehicle battery measurement method/strategy may use the equivalent circuit model using one or more resistant-capacitor (R-C) circuits in several configurations to measure the battery pack in the vehicle to obtain the electrochemical impedance during operation.

The calibration to control the battery pack may be accomplished using multiple tables to capture a wide frequency range that affects the impedance of the battery pack and its correlating dynamics. To populate/calibrate the multiple tables requires rigorous execution of offline testing of the battery pack in a test facility using complex algorithms. An example of offline testing of a battery pack is the Electrochemical Impedance Spectroscope (EIS) which may be implemented to capture the battery system characterization over wide frequency ranges that may include battery temperature, battery state of charge, battery state of discharge, and/or battery usage.

A vehicle battery measurement method may be implemented to eliminate the need of extensive offline testing. The vehicle battery measurement method may use one or more simple equivalent circuits to measure the battery pack in the vehicle to obtain the electrochemical impedance during operation. The vehicle battery measurement method may have a higher level of noise compared to EIS, however it may provide valuable information for characterizing the battery transient behavior during vehicle operation.

Figure 2:
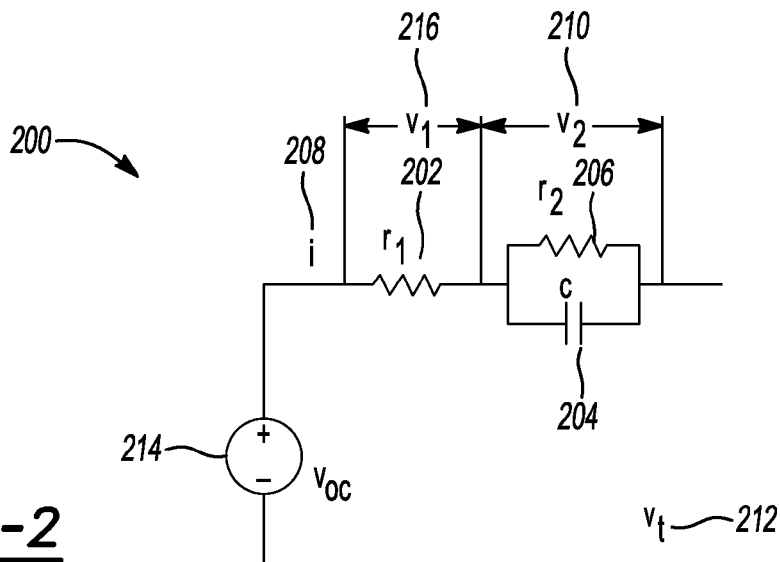
FIG. 2 is a schematic diagram of an equivalent circuit model of a battery.

FIG. 2 is a schematic of a simple equivalent circuit to model a battery. The circuit may model a battery including a battery pack and/or one or more battery cells. The simple equivalent circuit model 200 includes, in this example, a Randles Circuit Model. The Randles circuit (e.g., an RC circuit) consists of an active electrolyte resistance $r_1$ 202, in series with the parallel capacitance C 204, and an active charge transfer resistance $r_2$ 206. The Randles circuit allows the measurement of $v_t$ 212 terminal voltage, $v_{OC}$ 214 battery open circuit voltage, $v_1$ 216 internal battery voltage, and $v_2$ 210 the voltage of the R-C circuit. The Randles circuit may be implemented in a HEV battery management system to provide predictive computations for one or more battery parameters.

The HEV battery management system may implement the Randles Circuit Model to receive battery measurements for calculation of the electrochemical impedance and to estimate the battery parameters based on the impedance. The estimated battery parameters may include fluctuating trajectories which increase when the vehicle is in certain system modes including charging mode, sustaining mode, or depleting mode. These battery parameters tend to be sensitive to internal and external noises and environmental conditions when using a Randles circuit and/or other RC circuit configurations to estimate these parameters.

A system may receive the battery measurements to calculate battery power capability using a model parameter estimation that may include an average sense of effective battery internal resistance estimation during vehicle operation (e.g., real time operation). Battery power capability is affected by the impedance of the battery pack and its correlating dynamics. The battery model parameter estimation method may include battery measurement in the vehicle to obtain the electrochemical impedance with the use of an Extended Kalman Filter and other calculations/algorithms described in further detail below to calculate battery power capability.

The power capability of a battery may be determined by internal states and may be inferred by only using external system outputs. The calculations may be improved and the estimated parameter(s) may be less sensitive to the noise(s) by separating medium-to-high frequency dynamics (as shown more in FIG. 3) from the full frequency range dynamics. In consequence, the battery dynamics directly related to the power capability estimation is estimated from the separated medium-to-high frequency dynamics. Slow dynamics and instantaneous dynamics are represented by the real-time adjusting internal resistance. The constant resistance battery power limits may be directly related to low frequency. In other words, the low frequency may represent a steady-state of the battery dynamics.

A battery management system may be based on the implementation of a Randles Circuit Model to provide enough computation speed manageable for the battery management system without introducing additional hardware and/or increasing the system complexity. The equivalent circuit model 200 may allow the calculation of predictive battery system parameters including impedance of the battery pack, internal resistance, and its correlating dynamics.

The implementation of one or more offline tests including EIS provides battery system characterization over wide frequency ranges. The implementation of EIS may require long development timing for an application and additional hardware during the development of the HEV battery pack. Having a HEV with battery power capability prediction in real-time during vehicle operation is beneficial to the battery management system.

The characterization of the battery system may be calculated using a simplified approach with the use of one or more equivalent circuits for direct battery measurements in a HEV. The system may measure the battery current inputs and battery terminal voltage with the use of one or more RC circuits (e.g., Randle circuit). The measurement values may be recorded, calculated, and stored in one or more control modules in the vehicle computing system including the battery energy control module.

The HEV may have an offline calibration method and/or an online control method of controlling the battery pack. The offline and/or online method to calibrate the battery pack may not include a signal processor for separating the measured battery responses with the use of a high-pass filter, a low pass filter, a band-pass filter, and/or a combination thereof. With the use of the one or more filters and/or a digital filter comprising the one or more filters, the model parameter estimation may separate the received measured battery responses to the medium-to-high frequency range signals, and steady-state and slow dynamics parts. With the use of online estimation methods including, but not limited to, the Extended Kalman Filter, the method may calculate instantaneous current limits and power capability with improved robustness.

Figure 3:
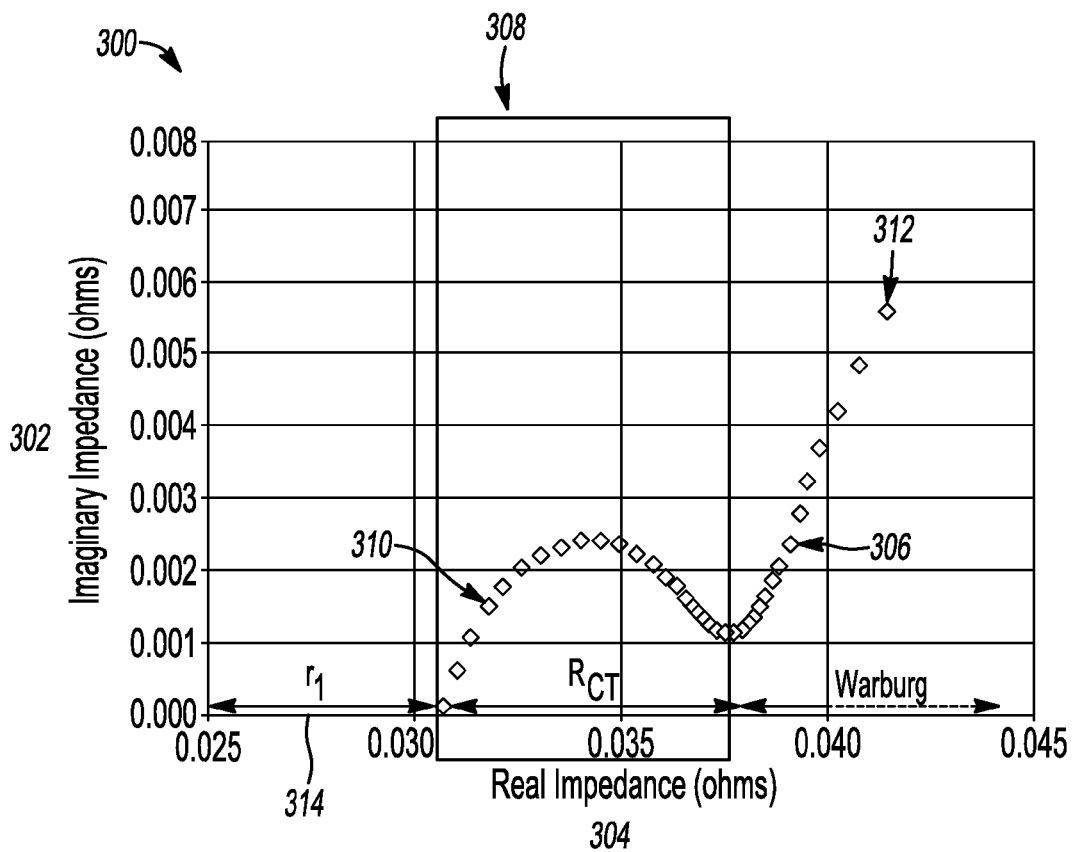
FIG. 3 is a graph illustrating an Electrochemical Impedance Spectroscopy Nyquist curve for description of the battery according to an embodiment.

FIG. 3 is a graph 300 illustrating an EIS Nyquist curve description of a battery. The EIS Nyquist curve description graph 300 has an x-axis representing real impedance 304 and a y-axis representing imaginary impedance 302. The curve 306 illustrates a measured impedance of the battery over a range of frequencies. The range of frequency responses of the system may reveal the energy storage and dissipation properties of the battery.

The EIS Nyquist curve description graph 300 may reveal information about the reaction mechanism of an electrochemical process for the battery including different reaction steps that may dominate at certain frequencies. The frequency response at the different reaction steps may help to identify the rate limiting steps. The curve 306 may represent the slow battery dynamic response caused by diffusion processes at the solid particle of the electrode active materials and polarization processes across the cell thickness. The instantaneous responses are determined by the internal resistance term $r_1$ 314. The dynamics responses that are represented by a medium-to-high frequency 310 mainly determine the power capability with the consideration of battery dynamics. The power capability may include, but is not limited to, maximum charge power and maximum discharge power. The slow dynamics represented by a low frequency 312 and instantaneous dynamics represented by $r_1$ 314 are modeled as the real-time adjusting internal resistance in the simple Randles circuit model.

The EIS Nyquist curve description graph 300 illustrates a direct physical interpretation of the battery system using one or more equivalent circuits. The graph 300 captures the battery dynamic responses 308 that may be used to estimate instantaneous battery power capability of the battery system. The dynamic responses 308 may be used to capture the medium-to-high frequency 310 that is in relation to the kinetic resistance of both electrodes.

A vehicle battery measurement method may implement the filtering of the measured battery responses such that it separates the medium-to-high frequency 310 from the low frequency 312. The method may be able to determine the dynamic response 308 of the system while eliminating the low frequency 312 by using one or more filters.

Figure 4A:
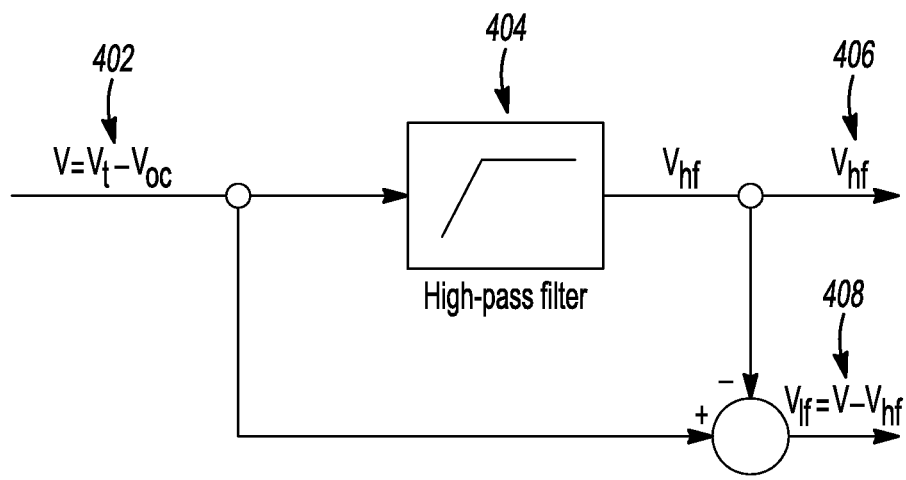
FIGS. 4A-4C are schematic diagrams of filters used for signal processing of measured battery responses according to an embodiment.
Figure 4B:
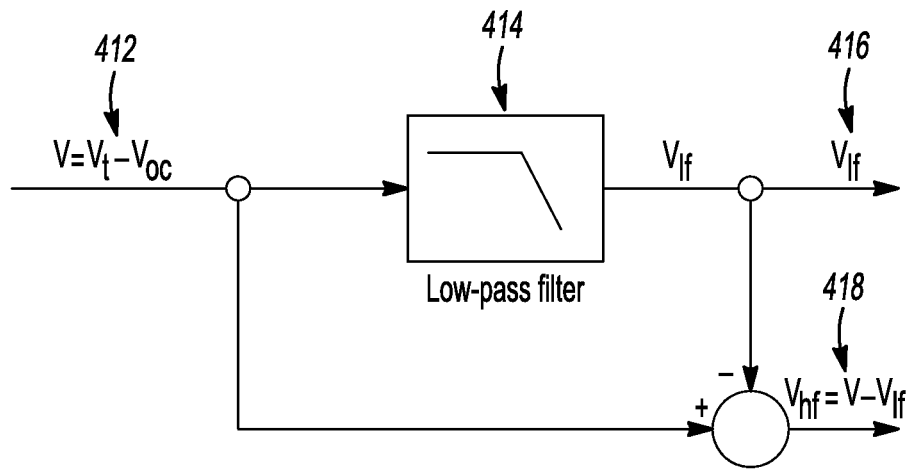
Figure 4C:
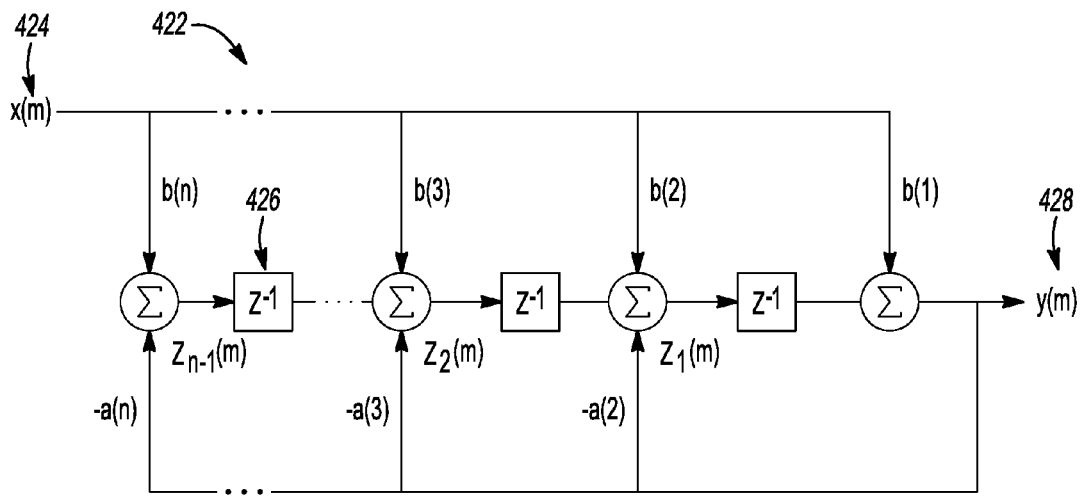

FIGS. 4A-4C are schematic diagrams of filters used for signal processing of measured battery responses. The vehicle battery measurement method may have one or more filters used to filter medium-to-high frequencies and low frequencies from the measured battery responses based on a threshold frequency. FIG. 4A represents a high pass filter 404 used to pass the medium-high frequency response signals from the battery system. The high pass filter 404 may eliminate the low frequency response signals from the vehicle battery measurement method based a threshold frequency.

The vehicle battery measurement method using a high pass filter may include an input voltage 402 that is the difference between the terminal voltage and the battery open circuit voltage. The input voltage 404 is sent to the high pass filter 404 for separating the medium-to-high frequencies from the low frequencies. The high pass filter output $v_{hf}$ 406 is the system voltage having medium-to-high frequencies. The high pass filter output $v_{hf}$ 406 may be used to determine one or more model parameters including, but not limited to, an active charge transfer resistance and the voltage of the equivalent circuit model.

The input voltage 402 may also be used to determine the system voltage having low frequencies using the high pass filter output 406. The system voltage having low frequencies $v_{lf}$ 408 is the difference between the input voltage 402 and the high pass filter output $v_{hf}$ 406. The system voltage low frequency $v_{lf}$ 408 may be used to determine one or more model parameters including, but not limited to, the active electrolyte resistance of the equivalent circuit model.

FIG. 4B represents a low pass filter 414 used to pass the low frequency response signals from the battery system. The low pass filter 414 may eliminate the medium-to-high frequency response signals from the vehicle battery measurement method based on a threshold frequency.

The vehicle battery measurement method using a low pass filter 414 may include an input voltage 412 that is the difference between the terminal voltage and the battery open circuit voltage. The input voltage 412 is sent to the low pass filter 414 for separating the low frequencies from the medium-to-high frequencies. The low pass filter output $v_{lf}$ 416 is the system voltage having low frequencies. The low pass filter output $v_{lf}$ 416 may be used to determine one or more model parameters including, but not limited to, the active electrolyte resistance of the equivalent circuit model.

The input voltage 412 may also be used to determine the system voltage having high frequencies 306 using the low pass filter output 416. The system voltage having high frequencies $v_{hf}$ 418 is the difference between the input voltage 412 and the low pass filter output $v_{lf}$ 416. The system voltage high frequency $v_{hf}$ 418 may be used to determine one or more model parameters including, but not limited to, the active charge transfer resistance and the voltage of the equivalent circuit model.

FIG. 4C represents a digital filter 422 that may be used to realize the required signal processing of the measured battery responses. In one embodiment, the digital filter 422 may be in the form of an Infinite Impulse Response (IIR) filter or a Finite Impulse Response (FIR) filter. The digital filter 422 may include a set of specifications that may filter medium-to-high frequencies from low frequencies. The set of specification that may filter medium-to-high frequencies form low frequencies may include a threshold frequency.

For example, the digital filter may receive an input signal 424 and include one or more feedback/feedforward paths with at least one summation and one or more unit delays 426. The digital filter output Y(z) 428 may have the following equation:

$$Y(z) = \frac{b(1) + b(2)z^{-1} + \ldots + b(nb+1)z^{-nb}}{1 + a(2)z^{-1} + \ldots + a(na+1)z^{-na}} X(z) \quad (1)$$

where Y(z) is the output signal, b(i) is the feedforward filter coefficients, a(i) is the feedback filter coefficients, and X(z) is the input signal.

The vehicle battery measurement method may estimate battery parameters based on the separated frequency responses received from the one or more filters. The measurement method may model the battery parameters using one or more equivalent circuits. The one or more equivalent circuits may include a Randles Circuit Model represented by the following equations:

$$v_1 = r_1 i \quad (2a)$$

where $v_1$ 216 is the voltage across resistance $r_1$ 202, which is an active electrolyte resistance (or an internal resistance), and i 208 is the current exciting the circuit.

$$\dot{v}_2 = -\frac{1}{r_2 C} v_2 + \frac{1}{C} i \quad (2b)$$

where $\dot{v}_2$ 210 is the voltage across the R-C circuit, which consists of $r_2$ 206 and C 204, i 208 is the current exciting the circuit, and $r_2$ 206 and C 204 represent battery dynamics changing during vehicle operation.

The estimated battery parameters based on the separated frequency may be represented by the following equations:

$$z = v_{OC} - v_t \quad (3)$$

where z is the difference between $v_{OC}$ 214 battery open circuit voltage and $v_t$ 212 terminal voltage.

$$v_1(k) = (1 - H(k))z(k) \quad (4)$$

where $v_1(k)$ is the filtered battery voltage responses having a low frequency component, and H(k) is the transfer function of the high pass filter. Furthermore, $v_1(k)$ is assigned to the voltage across $r_1$.

$$v_2(k) = H(k)z(k) \quad (5)$$

where $v_2(k)$ is filtered battery voltage responses having medium-to-high frequency component, and $v_2(k)$ is assigned to the voltage across the R-C circuit.

Based on the equations above, battery model parameters $r_2$ and C are estimated using an Extend Kalman Filter (EKF), and $r_1$ is estimated using the filtered voltage response in eqn. (4) and battery input current.

The EKF to estimate battery model parameters is formulated from the discretized form of equation (2b) and equation (5) as followed:

$$v_{2,k+1} = \left(1 - \frac{\Delta t}{r_2 C}\right) v_{2,k} + \frac{\Delta t}{C} i_k \quad (6)$$

where $\Delta t$ is the time step.

An augmented state vector is shown in the following equation:

$$X = [v_2 \, r_2 \, C]^T \quad (7)$$

A new expression of equation (6) using the augmented state vector X is show in the following Jacobian matrix equation:

$$\begin{bmatrix} v_{2,k+1} \\ r_{2,k+1} \\ C_{k+1} \end{bmatrix} = F_k \begin{bmatrix} v_{2,k} \\ r_{2,k} \\ C_k \end{bmatrix} + \begin{bmatrix} \Delta t/C_k \\ 0 \\ 0 \end{bmatrix} i_k \quad (8a)$$

where $F_k$ is the system matrix to describe system dynamics and model parameter changes.

A new expression of equation (5) using the augmented state vector X is shown in the following equation:

$$y_k = H_k \begin{bmatrix} v_{2,k} \\ r_{2,k} \\ C_k \end{bmatrix} \quad (8b)$$

where $H_k$ is the output matrix for calculating a system response.

The EKF estimates the battery model parameters through the prediction and update steps. The input current $i_k$ is transmitted to the algorithm at the specific operating point to allow the system to predict the battery parameters at that time variant. The model parameters are used to predict the voltage response when a constant current is applied during a time period. Based on the equations above, and EKF know variables, the updated filter equation may now predict the next state of the battery power capabilities using the predicted covariance equations as follows:

$$F_{k-1} = \frac{\partial f}{\partial x}\bigg|_{\hat{x}_{k-1|k-1}, u_{k-1}} \quad (9a)$$

$$P_{k|k} = cov(x_k - \hat{x}_{k|k}) = E((x_k - \hat{x}_{k|k})(x_k - \hat{x}_{k|k})^T) \quad (9b)$$

$$P_{k|k-1} = cov(x_k - \hat{x}_{k|k-1}) = E((x_k - \hat{x}_{k|k-1})(x_k - \hat{x}_{k|k-1})^T) \quad (9c)$$

$$P_{k|k-1} = F_{k-1} P_{k-1|k-1} F_{k-1}^T + Q_k \quad (10)$$

where (9a) is a Jacobian matrix derived from the function of $f$, k−1 is the time at which the Jacobian matrix is computed, P is a covariance matrix of the state estimation error, and $F_{k-1}$ includes the new parameters that have a physical relationship between the battery parameters and the system dynamics.

After the battery management system has predicted the battery power capability, the system may update the battery management system with the new battery measurement value. The new measurement value is based on the predicted battery power capability and the following equation:

$$\tilde{y}_k = y_k - h(\hat{x}_{k|k-1}) \quad (11)$$

where $h(\hat{x}_{k|k-1})$ is the estimation of the measurement. The $y_k$ measurement of the battery system is received and transmitted for use in the updating of the new battery measurement predicted value.

The following equation is the intermediate to determine the Kalman gain $K_k$:

$$S_k = H_k P_{k|k-1} H_k^T + R_k \quad (12)$$

The equation used to determine the Kalman gain $K_k$ is as follows:

$$K_k = P_{k|k-1} H_k^T S_k^{-1} \quad (13)$$

where the Kalman gain determines the update state vector $\hat{x}_{k|k}$ from the $K_k \tilde{y}$ as follows:

$$\hat{x}_{k|k} = \hat{x}_{k|k-1} + K_k \tilde{y}_k \quad (14)$$

The covariance of a state estimation error is in the following equation:

$$P_{k|k} = (I - K_k H_k) P_{k|k-1} \quad (15)$$

If the battery management system is enabled, for example when the vehicle is still in a key-on state, the system may continue to use the updated Kalman filter with the introduced variables to predict and update the power capabilities of the battery in real-time.

Figure 5:
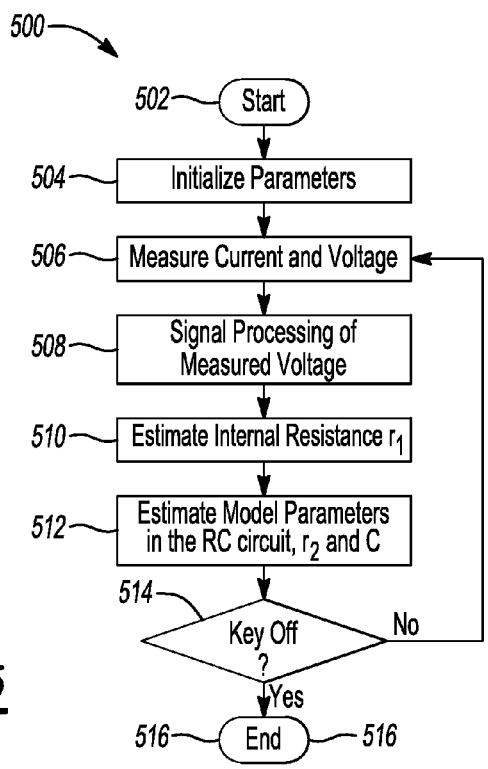
FIG. 5 is a flow chart of an algorithm for identifying one or more battery parameters used in a battery management method according to an embodiment.

FIG. 5 is a flow chart of an algorithm for identifying one or more battery parameters used in a battery management method 500. The method 500 is implemented using software code contained within the vehicle control module. In other embodiments, the method 500 is implemented in other vehicle controllers, or distributed amongst multiple vehicle controllers.

Referring again to FIG. 5, the vehicle and its components illustrated in FIG. 1 and FIG. 2 are referenced throughout the discussion of the method 500 to facilitate understanding of various aspects of the present disclosure. The method 500 of controlling the battery parameter prediction in the hybrid electric vehicle may be implemented through a computer algorithm, machine executable code, or software instructions programmed into a suitable programmable logic device(s) of the vehicle, such as the vehicle control module, the hybrid control module, another controller in communication with the vehicle computing system, or a combination thereof. Although the various steps shown in the flowchart diagram appear to occur in a chronological sequence, at least some of the steps may occur in a different order, and some steps may be performed concurrently or not at all.

At step 502, during a key-on event which allows the vehicle to be powered on, the vehicle computing system may begin powering up the one or more modules. The powering up of the one or more modules may cause variables related to the battery management system to initialize before enabling one or more algorithms used to control the battery at step 504.

The initialized parameters may be predetermined values or stored values at the last key off event. Before enabling the algorithms at a key-on event, the parameters should be initialized. For example, the battery management method may initialize several variables including, but not limited to, the battery terminal voltage, current limits, and/or other battery related parameters.

At 506, the system may measure the battery voltage outputs and current inputs using several types of sensors. Once the system has received the battery voltage responses and current measurements, the system may process the received signals to separate the medium-to-high frequency from the low frequency signals at step 508.

For example, with the use of one or more filters, the system may filter the measured voltage to extract the medium-to-high frequencies from the low frequencies. The medium-to-high frequencies and the low frequencies may be used to determine corresponding parameters of the equivalent circuit model respectively. The medium-to-high frequencies may be used to calculate the battery dynamics changing during vehicle operation. The battery dynamics changing during vehicle operation is represented by the R-C circuit in the equivalent circuit model. The low frequencies may be used to calculate the active electrolyte resistance (or the internal resistance) of the battery model.

At step 510, the estimated internal resistance $r_1$ may be calculated using the low frequencies that have been processed by the system using one or more filters. The system may estimate internal resistance $r_1$ with the filtered voltage response in eqn. (4) using the low frequency signals processed by one or more filters (e.g., high pass filter, low pass filter, etc. . . . ) and battery input current.

At step 512, the model parameters $r_2$ and C in the RC circuit are estimated using the Extend Kalman Filter (EKF) formulated in eqn. (6). The augmented state vector shown in eqn. (7) may be applied to the Jacobean matrix in eqn. (8). Based on the equations above, and the EKF known variables, the updated filter equation may now predict the next state of the battery power capabilities using the predicted covariance equations as stated in eqn. (9) and eqn. (10).

At step 514, if the system detects a key-off event, the system may end the one or more algorithms used to manage the battery pack and/or the one or more battery cells. The vehicle computing system may have a vehicle key-off mode to allow the system to store one or more parameters in non-volatile memory such that these parameters may be used by the system for the next key-on event at step 516.

Figure 6:
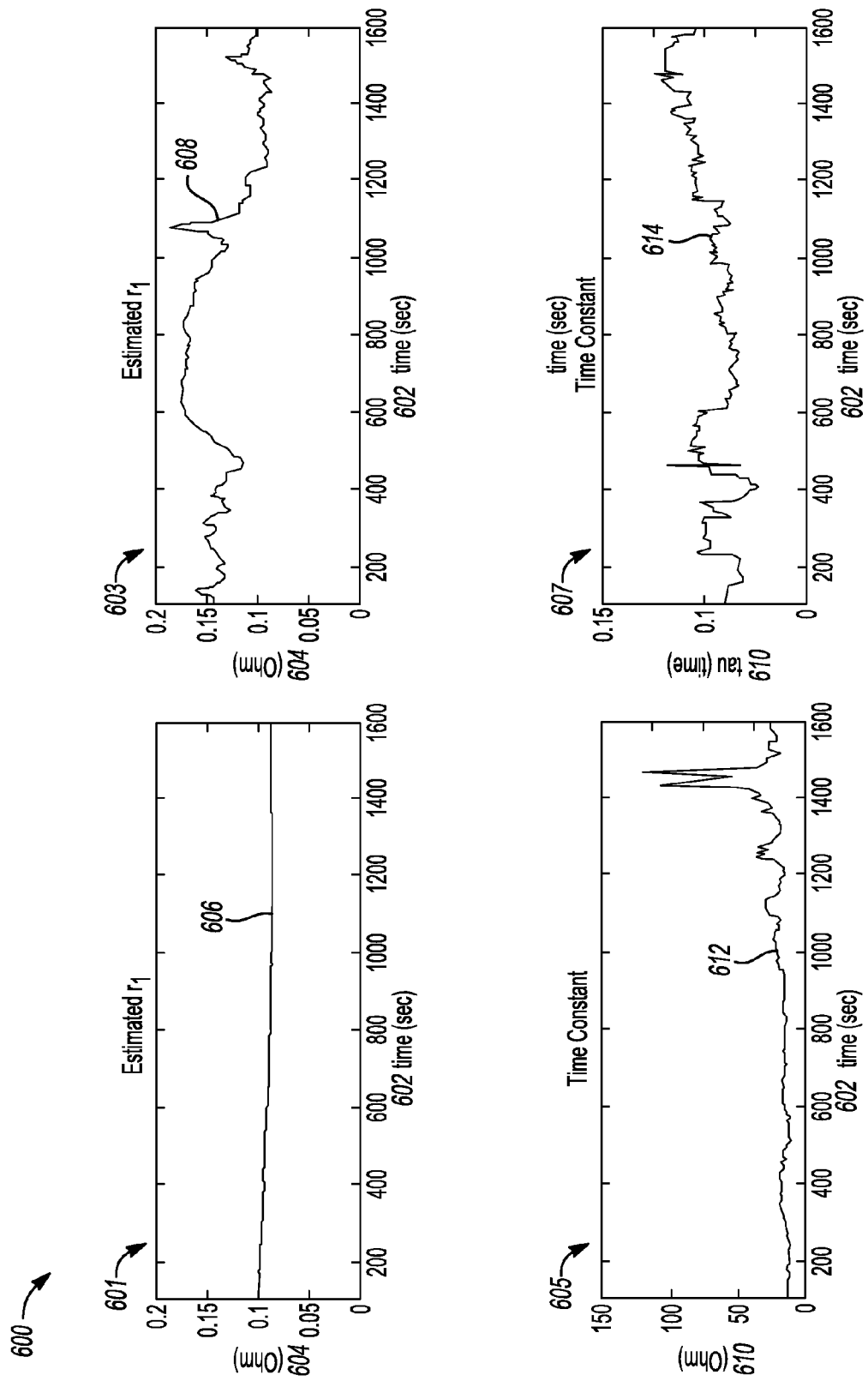
FIG. 6 are graphs illustrating a comparison of battery model parameter estimation results in the equivalent circuit model according to an embodiment.

FIG. 6 are graphs 600 illustrating a comparison of battery model parameter estimation results in the R-C circuit. The upper graphs 601, 603 have an x-axis representing time (in seconds) 602 and a y-axis representing resistance of $r_1$ in ohms 604. The lower graphs 605, 607 have an x-axis representing time (in seconds) 602 and a y-axis representing tau ($\tau$) 610.

The previous approach without the use of a filter is illustrated in graph 601 by assigning the slow dynamics to the RC circuit, which is also designed to represent medium-to-fast dynamics. The previous estimated $r_1$ approach graph 601 illustrates parameter data 606 that does not use the frequency domain separation. One RC circuit in the equivalent circuit model cannot capture multiple time constants due to its inherent limitation (i.e., slow dynamics and fast dynamics may not be represented at the same time). In other words, one RC circuit has one time constant to represent dynamics. Thus, when wide ranges of frequency components should be covered by one RC circuit, the identified model parameters, or time constant 612, in the RC circuit may be unstable or changing too large as shown in graph 605.

The proposed approach illustrated in graph 603 assigned the slow dynamics to the internal resistance, and only the medium-to-high frequency component is assigned to the RC circuit. The signal separation in the frequency domain provides filtered information to identify the internal resistance and the model parameters in the RC circuit separately. The real-time adaptation algorithm, such as EKF, may capture the slow dynamics while identifying the internal resistance. The model parameters in the RC circuit are separately identified. Therefore, the identified dynamics, represented by the time constant 614 illustrated in graph 605, is much more stable compared to the previous approach as illustrated in graph 612.

The proposed estimated $r_1$ approach graph 603 illustrates updated parameter data 608 using the frequency domain separation. The updated parameter data 608 allows the system to capture the battery dynamic behavior by filtering the medium-to-high frequency responses to identify improved battery power capability parameters. The identified $r_1$ using the proposed approach includes slow dynamics. Therefore the $r_1$ may be an equivalent internal resistance including slow dynamics of the battery.

The identified time constant disclosed in this example is around 0.1 seconds as represented in the lower graphs 605, 607. The identified time constant is stable, and the value is well matched to the charge transfer dynamics in Li-ion batteries. The slow dynamics are captured by the real-time adjusted $r_1$ illustrated in the upper graphs 601, 603. In general, battery power capability during the next few seconds is significant, so that the disclosed method may capture the battery dynamics important for battery power capability prediction with the consideration of slow change of the internal impedance, resulting in improved prediction accuracy. For example, the method may capture the maximum discharge power available based on the frequency domain separation.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
 a battery pack; and
 at least one controller programmed to
  control operation of the battery pack in response to (i) parameter values indicative of an internal resistance of the battery pack that are based on terminal voltage data of the battery pack having frequency content less than a threshold frequency and (ii) parameter values indicative of an internal impedance of the battery pack that are based on terminal voltage data of the battery pack having frequency content greater than the threshold frequency.

2. The vehicle of claim 1, wherein the internal resistance is an active electrolyte resistance of the battery pack.

3. The vehicle of claim 1, wherein the internal impedance includes a capacitance and an active charge transfer resistance of the battery pack.

4. The vehicle of claim 1, wherein the threshold frequency is based on electrochemical characteristics of the battery pack.

5. The vehicle of claim 1, wherein the at least one controller is further programmed to apply a frequency selective filter to obtain one of (i) the terminal voltage data of the battery back having frequency content greater than the threshold frequency or (ii) the terminal voltage data of the battery back having frequency content less than the threshold frequency.

6. The vehicle of claim 5, wherein the at least one controller is further programmed to generate the other of (i) the terminal voltage data of the battery back having frequency content greater than the threshold frequency and (ii) the terminal voltage data of the battery back having frequency content less than the threshold frequency based on a difference between an input voltage of the battery pack and the one of (a) the terminal voltage data of the battery back having frequency content greater than the threshold frequency or (b) the terminal voltage data of the battery back having frequency content less than the threshold frequency.

7. The vehicle of claim 1, wherein the at least one controller is further programmed to output a maximum discharge power available during predetermined periods based on the parameter values.

8. The vehicle of claim 1, wherein the at least one controller is further programmed to output a maximum charge power available during predetermined periods based on the parameter values.

9. A battery management method comprising:
 controlling operation of a battery pack in response to parameter values indicative of an internal resistance of the battery pack that are based on terminal voltage data of the battery pack having frequency content less than a threshold frequency and in response to parameter values indicative of an internal impedance of the battery pack that are based on the terminal voltage data having frequency content greater than the threshold frequency.

10. The method of claim 9, wherein the internal resistance is an active electrolyte resistance of the battery pack.

11. The method of claim 9, wherein the internal impedance includes a charged capacitance and active charge resistance of the battery pack.

12. The method of claim 9, wherein the threshold frequency is based on electrochemical characteristics of the battery pack.

13. The method of claim 9, further comprising applying a frequency selective filter to obtain one of (i) the terminal voltage data of the battery back having frequency content greater than the threshold frequency or (ii) the terminal voltage data of the battery back having frequency content less than the threshold frequency.

14. The method of claim 13, further comprising generating the other of (i) the terminal voltage data of the battery back having frequency content greater than the threshold frequency and (ii) the terminal voltage data of the battery back having frequency content less than the threshold frequency based on a difference between an input voltage of the battery pack and the one of (a) the terminal voltage data of the battery back having frequency content greater than the threshold frequency or (b) the terminal voltage data of the battery back having frequency content less than the threshold frequency.

15. The method of claim 9, further comprising outputting a maximum discharge power available during predetermined periods based on the parameter values or a maximum charge power available during predetermined periods based on the parameter values.

16. A hybrid powertrain system comprising:
   a battery pack having one or more battery cells; and
   at least one controller programmed to
      implement a model of the battery pack,
      filter terminal voltage data of the battery pack into high-frequency content having frequencies greater than a threshold and low-frequency content having frequencies less than the threshold, and
      control operation of the battery pack in response to predicted available battery power derived from (i) parameter values indicative of an internal resistance of the battery pack that are based on the low-frequency content and (ii) parameter values indicative of an internal impedance of the battery pack that are based on the high-frequency content.

17. The hybrid powertrain system of claim 16, wherein the internal resistance is an active electrolyte.

18. The hybrid powertrain system of claim 16, wherein the internal impedance includes a capacitance and an active charge transfer resistance.

19. The hybrid powertrain system of claim 16, wherein the predicted available battery power includes a maximum discharge power available during predetermined periods.

\* \* \* \* \*